United States Patent Office 3,518,797
Patented July 7, 1970

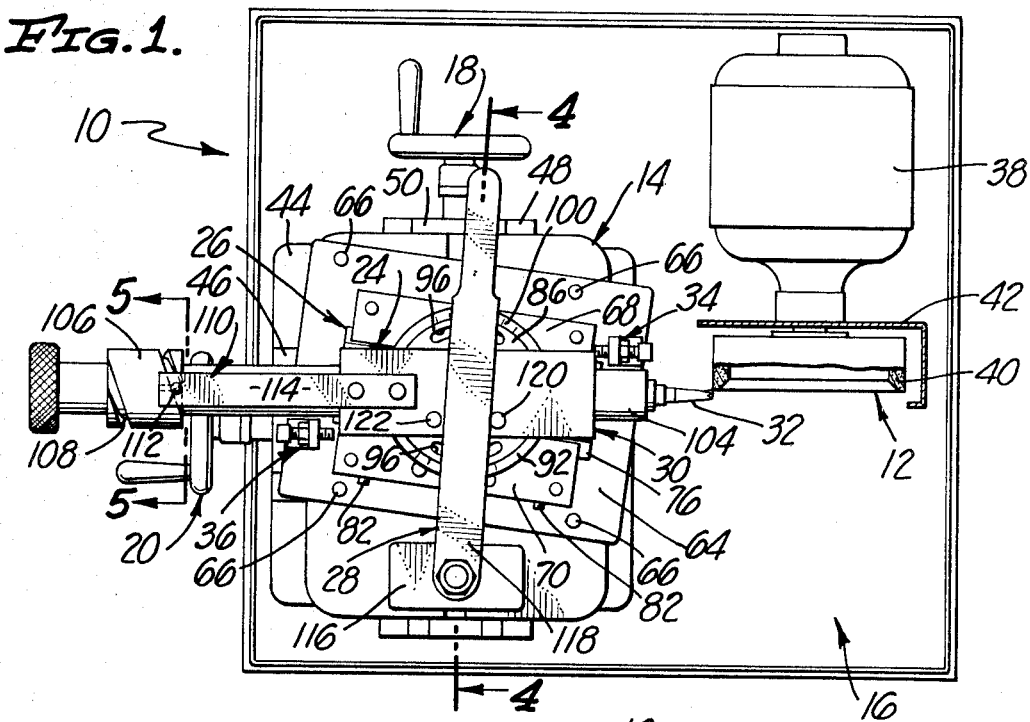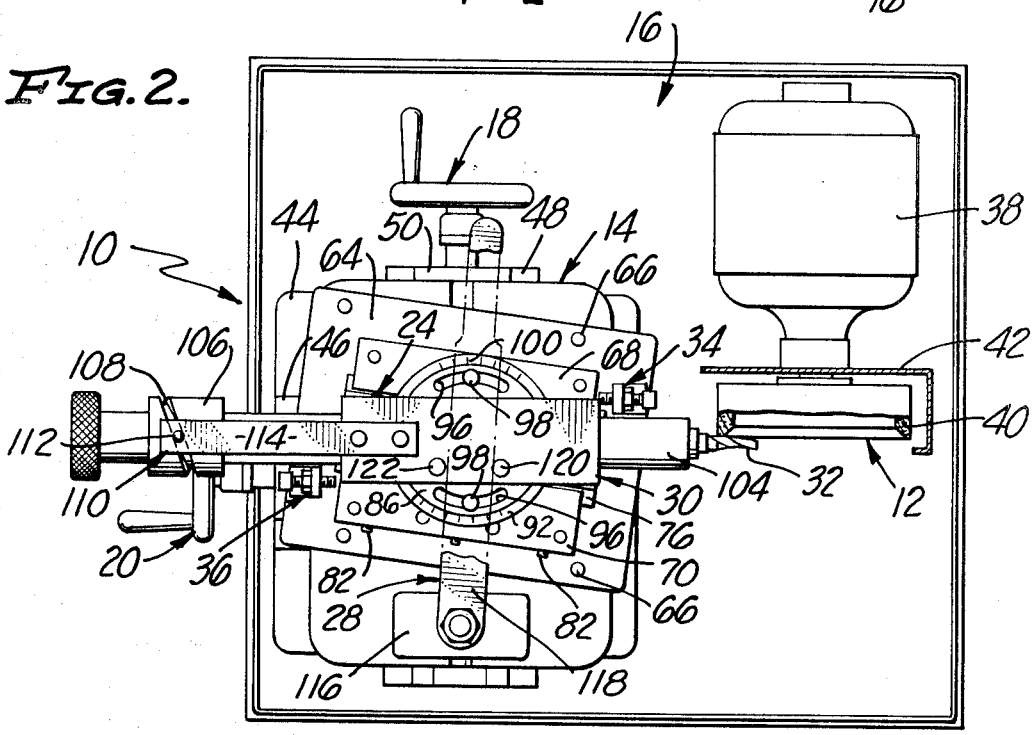

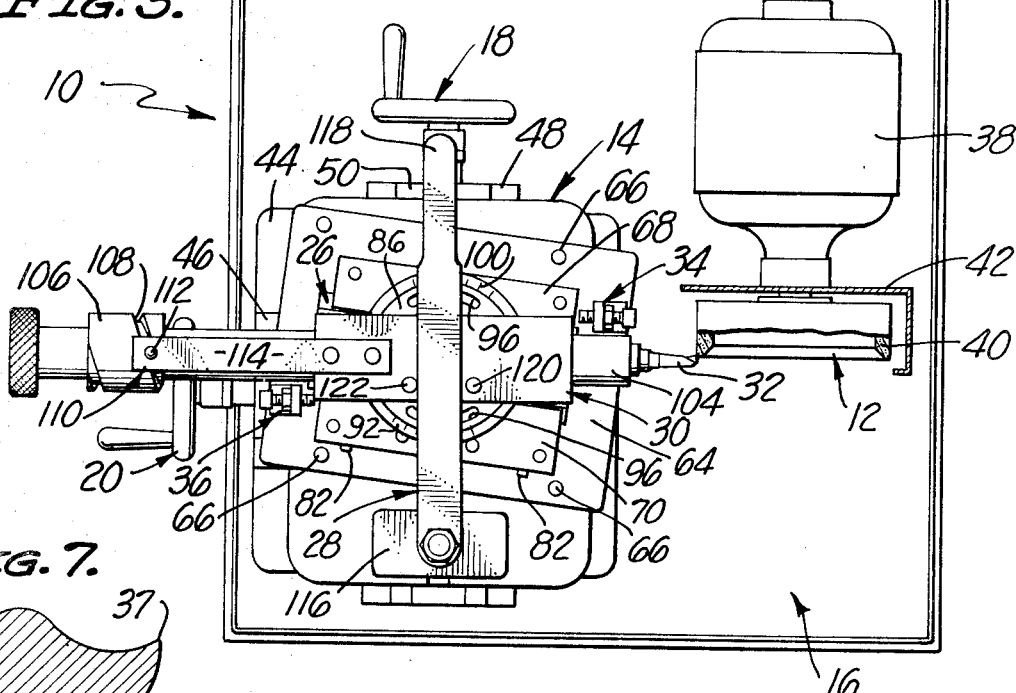
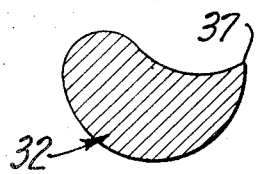
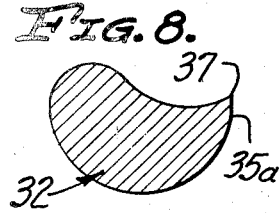
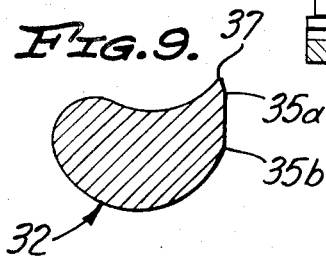
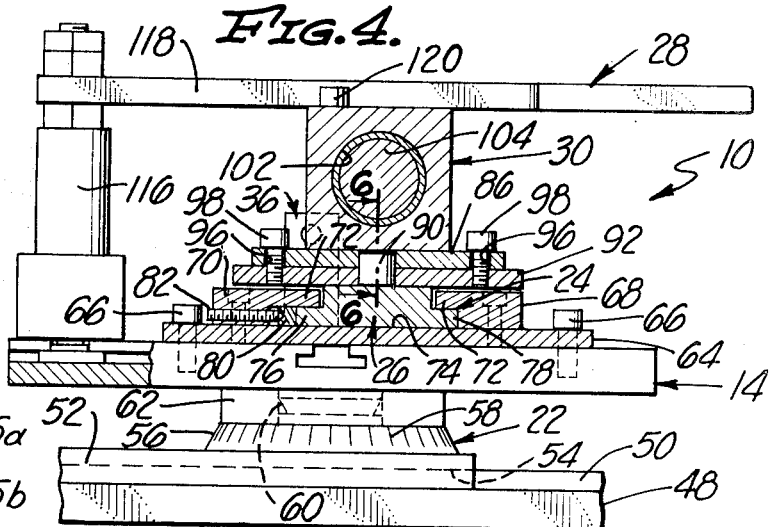
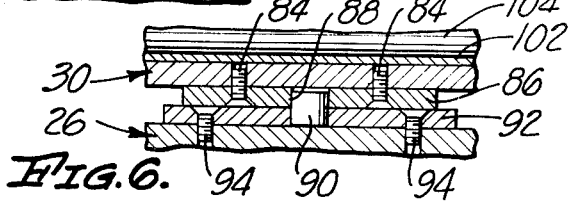
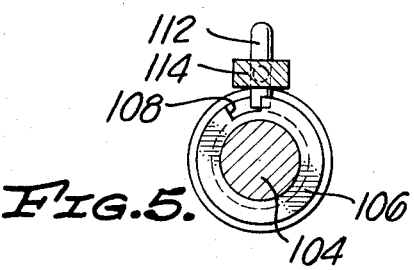

3,518,797
ROUTER BIT EDGE FORMING MACHINE
Harry J. Ballard, 15719 Larkspur,
Sylmar, Calif. 91342
Filed Nov. 6, 1967, Ser. No. 680,795
Int. Cl. B24b 3/10
U.S. Cl. 51—123                4 Claims

ABSTRACT OF THE DISCLOSURE

A machine for forming separate spiral-shaped edges on the exterior of router bits and the like comprising a grinding element and a bit carrier. A slide supports the carrier for spiral movement toward and away from the grinding element while the slide is supported for movement between forward and rearward positions on a track inclined at an acute angle to the surface of the grinding element engaging the bit.

---

The present invention relates to the manufacture of router bits, end mills and the like, and more particularly to a machine for forming separate spiral edges on the exterior of spiral-fluted router bits and the like.

During routing operation, it is desirable that only the cutting edge of a router bit contact the work and that metal chips, shavings, and the like produced during routing not bind the router bit. To permit such operation to occur, it is common for the surface of router bits immediately following their spiral-cutting edges to be relieved. Of course, it is desirable that the relief be as extensive as possible while retaining sufficient strength in the cutting edge to resist break-off during routing operation.

Various machines have been employed to relieve the cutting edges of router bits. One such machine is the "edge forming" machine so named because it shapes the relief by forming successive spiral-shaped relief edges on the exterior of router bits immediately following their cutting edges. Such machines basically comprise a stationary grinding wheel and a table mounted for rectilinear motion in response to the turning of front and side feed screws. The table supports a carrier for a router bit such that the carrier may be simultaneously turned and advanced toward and retracted from the grinding wheel—the router bit following a spiral path. By careful rectilinear positioning of the table, through turning of the feed screws, the carrier may be located in a position wherein a forward turning of the carrier causes the grinding wheel to engage the router bit and grind a first or primary relief edge on the exterior thereof immediately following the cutting edge of the router bit. A secondary relief edge may be formed in the same manner after setting of the table in a new position relative to the grinding wheel, again by selective turning of the feed screws.

The foregoing operation of rectilinear setting of the table for each edge forming operation is repeated for each router bit in a router bit forming process. Needless to say, the edge-forming operation is quite time consuming and requires specially trained workmen. The labor costs normally associated with such edge-forming operations are therefore quite high and substantially elevate the overall cost of router bits to the ultimate consumer.

In view of the foregoing, it is an object of the present invention to provide an improved router bit edge-forming machine in which the router bit carrier may be simply and rapidly set in predetermined positions ready for grinding successive relief edges on the router bit and which does not necessitate use of feed screws or the like, thereby significantly reducing the labor costs normally associated with the manufacture of sprial-fluted router bits.

Another object of the present invention is to provide an improved edge-forming machine of the foregoing character which is relatively inexpensive and easy to assemble, disassemble and service.

A further object of the present invention is to provide a relief edge-forming machine of the foregoing character which is capable of forming relief edges which follow the contour of differently shaped spiral flutes in router bits of different design.

The foregoing as well as other objects and advantages of the present invention may be more clearly understood by reference to the following detailed description when considered with the drawings which, by way of example only, illustrate one form of edge-forming machine embodying the features of the present invention.

In the drawings:

FIG. 1 is a plan view of an edge-forming machine in a position ready to form a first spiral-shaped edge on a router bit;

FIG. 2 is a plan view of the machine immediately after the first edge has been formed;

FIG. 3 is a plan view of the machine in a position ready to form a second edge on the router bit;

FIG. 4 is a sectional view taken along the line 4—4 in FIG. 1;

FIG. 5 is a sectional view taken along the line 5—5 in FIG. 1 illustrating the router bit carrier, cam, and the cam follower for guiding the router bit along a spiral path;

FIG. 6 is a fragmentary sectional view taken along the line 6—6 in FIG. 4;

FIG. 7 is a sectional view through a forward tip end of the router bit prior to the forming of the relief edges thereon;

FIG. 8 is a sectional view similar to FIG. 7 after the first relief edge has been formed on the router bit; and FIG. 9 is sectional view similar to FIG. 8 after the second relief edge has been formed on the router bit.

In the drawings, the edge-forming machine is represented by the numeral 10 and, generally speaking, comprises a grinding element 12 and a horizontal table 14. The grinding element is mounted on a frame 16 for turning in a vertical plane while the horizontal table 14 is supported for rectilinear as well as rotary motion by feed screw means 18 and 20, and a swivel mount 22, respectively. Horizontal track means 24 extend rearwardly along the top of the table 14 and at a predetermined and adjustable acute angle relative to the vertical plane including the grinding element 12. A slide 26 is adapted for movement along the track means 24 between forward and rearward positions and is moved between such positions by a lever assembly 28. The slide 26 carries a router bit guide 30 supporting a router bit 32 for movement along the vertical plane and against the side of the grinding element 12 as the router bit is turned and advanced toward the grinding element. The forward and rearward positions assumed by the slide 26 along the track means 24 are set by adjustable front and rear stop members 34 and 36 which engage the slide in the forward and rearward positions.

The angle of the track means 24 and the forward and rearward positions for the slide 26 are selected such that when the slide is in the forward position and the router bit 32 is turned and advanced against the grinding element along a spiral path, a first relief edge 35a (see FIG. 8) is formed in the exterior of the router bit immediately following the bit's cutting edge 37. Similarly, when the slide 26 is in the rearward position and the router bit 32 is advanced along the same spiral path, a second relief edge 35b (see FIG. 9) is formed on the exterior of the router bit immediately following the cutting edge 37.

With regard to the foregoing operation of the machine 10, FIGS. 1, 2, and 3 represent the machine in three different positions. In FIG. 1, the machine 10 is ready to form the first relief edge 35a on the router bit 32. Note that the lever assembly 28 is in a forward position in FIG. 1 placing the slide 26 in its forward position. FIG. 2 depicts the machine 10 after the router bit 32 has been advanced along the spiral path and after the first edge 35a has been formed in the exterior of the bit. Again, note that the lever assembly 28 is in the forward position. In FIG. 3, the lever assembly 28 is in a rearward position and the slide 26 has been moved to the predetermined rearward position readying the router bit 32 for grinding of the second edge 35b upon a forward spiraling movement of the bit against a side of the grinding element 12.

From FIG. 9, it is noted that after the formation of the second relief edge 35b, sufficient amounts of metal have been removed from behind the cutting edge 37 to insure that only the cutting edge will engage the work during routing operation and that metal chips, shavings, and the like produced during the routing will pass behind the cutting edge without binding the bit. At the same time, the quantity of metal remaining in the cutting edge 37 is sufficient to insure a strong cutting edge which will not break off during normal routing operation.

In summary then, to form successive relief edges with the edge-forming machine 10, the operator mounts the router bit 32 relative to the slide 26 and in the guide 30, moves the lever assembly 28 forward to bring the slide to the forward position, and turns and advances the router bit along the spiral path into contact with and along the side of the grinding element 12 to form the first edge 35a. The operator then retracts the router bit 32 from the grinding element 12, pulls back on the lever assembly 28 to move the slide 26 to the rearward position and then again advances the router bit along the same spiral path to form the second relief edge 35b. It should be apparent that such operation is extremely simple and rapid particularly when compared with the time consuming and laborious task of adjusting feed screws as is commonplace with prior types of edge-foming machines for router bits and the like.

Referring now more specifically to the drawings and to the particular embodiment illustrated therein, the grinding element 12 comprises a drive motor 38 for turning a grinding cup 40 of abrasive material in a vertical plane. The grinding cup 40 is partially covered by a shield 42 which deflects flying metal particles produced upon grinding of the router bit 32 against a right side of the cup. The motor is supported on top of the frame 16 which in addition thereto supports the table 14 and the balance of the edge-forming machine 10.

The support provided by the frame 16 for the table 14 and the other elements of the machine 10 is most clearly depicted in FIGS. 3 and 4. As represented, a horizontal base member 44 is mounted directly atop the frame 16 and includes a rearwardly extending flat ridge 46 having dovetailed sides (not shown). A carriage slide 48 is supported for fore and aft sliding movement along the base member 44 by means of a bottom slot (not shown) which receives the ridge 46—fore and aft positioning movement being imparted to the carriage slide by a turning of the feed screw assembly 20. Perpendicular to the bottom slot in the carriage slide 48 is a flat-top ridge 50 having dovetailed edges. A carriage 52 is supported for lateral sliding movement along the carriage slide 48 by means of a bottom slot 54 which receives the ridge 50—lateral positioning movement being imparted to the carriage by the feed screw assembly 18.

Extending upwardly from the top of the carriage 52 is a frusto-conical plate 56 carrying an annular scale 58 graduated in degrees. Coaxial with the plate 56 and extending upwardly therefrom is a pivot 60. The pivot 60 is adapted for insertion into a sleeve 62 extending downwardly from the bottom of the table 14 and supports the table for rotation about a vertical axis, whereby the angle of the table and the components mounted thereon may be selectively adjusted relative to the vertical plane including the grinding element 12. In this regard, set screw means or the like (not shown) may be incorporated to lock the table 14 in predetermined angular positions on the pivot 60.

As previously indicated, horizontal track means 24 are included on the table 14 and extend at a predetermined acute angle relative to the vertical plane including the grinding element 12. In the illustrated form of the machine 10, the track means 24 includes a base plate 64 secured to the top of the table by a plurality of screws 66. Connected to and extending upwardly from the base plate 64 is a pair of laterally spaced slide clamps 68 and 70 including flanges 72 projecting inwardly over the base plate and defining a horizontal channel or track 74 along the top of the base plate. It is to be noted that the track 74 extends at an acute angle to the vertical plane including the grinding element 12.

Stationed for sliding movement along the track 74 is the slide 26. In the illustrated embodiment, the slide 26 comprises a rectangular plate having outwardly projecting side flanges 76 and 78 extending under the flanges 72 of the slide clamps. A gib 80 is located between a left side of the flange 76 and is held in place by a set screw 82 extending through the side clamp 70 as illustrated most clearly in FIG. 4. Thus supported, the slide 26 is adapted for longitudinal sliding movement along the track 74 and at the acute angle thereof relative to the vertical plane including the grinding element 12.

As previously discussed, the slide 26 provides support for the router bit guide 30. In the illustrated form of the machine 10, the router bit guide 30 comprises a metal block secured by screws 84 (see FIG. 6) to a swivel plate 86. The swivel plate 86 includes a central opening 88 receiving a pivot 90 extending upwardly from the slide 26. A swivel base 92 is secured to the top of the slide by screws 94 and together with the pivot 90 provides support for the swivel plate 86, permitting the swivel plate to turn with the guide through predetermined arcs, the limits of which are determined by ends of arcuate slots 96 in the swivel plate (see, for example, FIGS. 3 and 4). Each arcuate slot 96 receives a hand turnable screw 98 which extends into the swivel base 92. Upon loosening of the screws 98, the swivel plate 86 may be rotated on the pivot 90 to turn the guide 30 relative to the slide 26. A scale 100 extends along the top of the swivel base 92 adjacent the edge of the swivel plate 86 and is graduated in degrees. The guide 30 therefore may be carefully and accurately turned relative to the slide 26 to insure that the router bit 32 supported thereby extends parallel to the vertical plane of the grinding element 12 independent of the angle of the table 14 and hence of the track 74 relative to the vertical plane. As will be described in greater detail hereinafter, such angular adjustment of the router bit guide 30 is an important feature of the machine 10 and enables the machine to be rapidly set to produce relief edges along spiral cutting edges of bits of different shape and design.

As indicated previously, the router bit guide 30 functions to support the router bit 32 for movement along the vertical plane and against the grinding element 12 as the router bit is advanced along a spiral path. To this end, the block defining the guide 30 includes a horizontal bore 102 for receiving a cylindrical router bit carrier or stick 104. The carrier 104 is adapted to securely receive the router bit 32 at its forward end and is adapted for back and forth sliding movement and rotation within the bore 102.

A sleeve 106 including a spiral-shaped cam slot 108 is secured to a rear end of the carrier 104 as illustrated in FIG. 1, 2, 3, and 5. The spiral shape of the cam slot 108 defines the spiral path through which the router bit 32 is advanced in forming the first and second relief edges.

To guide the router bit 32 along the spiral path, a cam follower 110 is secured to the guide 30 and extends into the cam slot 108. In the illustrated form of the machine, the cam follower 110 comprises a vertical pin 112 extending from a bar 114 secured to the top of the guide 30.

Thus arranged, rotation of the carrier 104 in a clockwise direction (when viewed in FIGS. 1, 2, and 3) produces a forward advancement and turning of the router bit 32 along the spiral path defined by the cam slot and against the right side of the grinding cup to form the first relief edge when the slide 26 is in its forward position. Similarly, a like forward turning of the carrier 104 advances the router bit 32 along the same spiral path to form the second relief edge when the slide 26 is in its rearward position.

Movement of the slide 26 between the forward and rearward positions is controlled by the lever assembly 28. In the illustrated form of the machine 10, the lever assembly 28 comprises a pivot base 116 secured to the table 14 and extending upwardly therefrom to connect to a horizontal lever arm 118 extending over the top of the guide block 30 and transverse thereto. A pair of pins 120 and 122 extends vertically from the top of the guide block 30 on opposite sides of the lever arm 118 and defines bearing shoulders against which the lever arm presses in moving the guide block and hence the slide between the forward and rearward positions. In this regard, note that the stop member 34 engages the guide 30 when the lever arm 118 is pressed forward to define the forward position for the slide 26 (see FIGS. 1 and 2) while the stop 36 engages the guide 30 when the lever arm is pulled in a rearward direction to define the rearward position for the slide (see FIG. 3).

From the foregoing description, it should be appreciated that the structure of the machine 10 with its capability of rapidly moving the slide 26 between the forward and rearward positions, eliminates the necessity of carefully adjusting the table 14 in a rectilinear manner by use of the feed screw assemblies 18 and 20 each time a different spiral relief edge is to be formed. In short, the angular arrangement of the slide 26 relative to the vertical plane of the grinding element 12 permits the router bit 32 to be moved directly along a diagonal to positions wherein a subsequent spiral turning of the router bit will form the desired first and second relief edges. This, of course, is for a spiral or helix of a predetermined angle, for example, a 30° angle. Should the spiral of the cutting edge be of a different design or angle, the relief edges to follow the cutting edge must also be of a different spiral shape. But for the rotatability of the table 14 and the guide 30, rectilinear adjustments would be required to enable the machine 10 to produce relief edges of different spiral configuration. Since the table 14 and guide 30 are rotatable, however, when it is desired to produce relief edges of different spiral design, the sleeve 106 is replaced with a similar sleeve having a spiral cam for generating the different spiral shaped relief edge. The table 14 is then rotated on the pivot 60 to a new angle related to the angle of the new spiral and the guide 30 rotated on the slide 26 to again bring the carrier 104 into a vertical plane parallel to the vertical plane of the grinding element 12. The table 14 and guide 30 are then locked in place and the previously described grinding operation is repeated with the slide in the forward and rearward positions to produce first and second relief edges of the new spiral design.

From the foregoing, it is appreciated that the present invention provides an improved router bit edge-forming machine in which the router bit carrier may be simply and rapidly set in predetermined positions ready for grinding successive relief edges on the router bit and which does not necessitate the use of feed screws or the like, thereby significantly reducing the labor costs normally associated with the manufacture of spiral-fluted router bits. Further, the improved edge-forming machine is relatively inexpensive and easy to assembly, disassemble, and service. Moreover, the relief edge-forming machine of the present invention possesses the capability of being rapidly settable to form relief edges which follow the contour of differently shaped spiral flutes in router bits of different design.

While a particular edge-forming machine has been described in some detail herein, changes and modifications may be made therein without departing from the spirit of the invention. It is therefore intended that the present invention be limited in scope only by the terms of the following claims.

I claim:

1. A machine for removing metal from the exterior of spiral-fluted router bits and the like by grinding separate and successive spiral edges along and following the outer edge of such spiral flutes, said machine comprising:
   a grinding wheel supported for turning on a horizontal axis and including a vertical grinding face;
   a horizontal table;
   horizontal track means on said table and extending at a predetermined acute angle relative to said vertical grinding face;
   a slide for moving along said track means between predetermined forward and rearward positions;
   means for moving said slide along said track means to said forward position for a first grinding operation and for moving said slide along said track means to said rearward position for a second grinding operation; and
   router bit guide means on said slide for supporting and maintaining a router bit with its axis in a horizontal plane and with a longitudinal exterior surface thereof in a vertical plane including said vertical grinding face, and for supporting said router bit for helical advancement against and in a direction substantially parallel to said vertical grinding face with a turning of said router bit in said guide means, whereby a first relief edge is formed on the exterior of said bit following the outer edge of its spiral flute when said slide is in said forward position and a second relief edge is formed on the exterior of said bit following the outer edge of its spiral flute when said slide is in said rearward position.

2. The machine of claim 1 further comprising means mounting said router bit guide means for turning on a vertical axis on said slide between predetermined angles to preset said machine.

3. The machine of claim 2 further comprising means mounting said table for turning on a vertical axis between predetermined angles to preset said machine.

4. The machine of claim 3 further comprising means for locking said router bit guide means in predetermined angular positions relative to said table.

References Cited

UNITED STATES PATENTS

| | | | |
|---|---|---|---|
| 1,314,154 | 8/1919 | Scrivenor | 51—225 X |
| 1,759,044 | 5/1930 | Vlieg | 51—225 |
| 2,362,288 | 11/1944 | Melin | 51—225 |
| 2,368,342 | 1/1945 | Zwick | 51—123 |

HAROLD D. WHITEHEAD, Primary Examiner

U.S. Cl. X.R.

51—225